_(12)_ United States Patent
Jiang et al.

(10) Patent No.: US 11,134,523 B2
(45) Date of Patent: Sep. 28, 2021

(54) UPLINK TRANSMISSION CONTROL METHOD AND APPARATUS AND COMMUNICATION SYSTEM

(71) Applicant: FUJITSU LIMITED, Kawasaki (JP)

(72) Inventors: Qinyan Jiang, Beijing (CN); Hua Zhou, Beijing (CN); Lianhai Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/365,171

(22) Filed: Mar. 26, 2019

(65) Prior Publication Data

US 2019/0223214 A1 Jul. 18, 2019

Related U.S. Application Data

(63) Continuation of application No. PCT/CN2016/111799, filed on Dec. 23, 2016.

(51) Int. Cl.
*H04W 74/08* (2009.01)
*H04L 27/26* (2006.01)
(Continued)

(52) U.S. Cl.
CPC ......... *H04W 74/085* (2013.01); *H04L 5/0094* (2013.01); *H04L 27/2646* (2013.01);
(Continued)

(58) Field of Classification Search
None
See application file for complete search history.

(56) References Cited

U.S. PATENT DOCUMENTS

2011/0039499 A1 2/2011 Zhang et al.
2012/0063393 A1* 3/2012 Du ................... H04W 36/0077
370/329

(Continued)

FOREIGN PATENT DOCUMENTS

CN 105122917 A 12/2015
CN 105682232 A 6/2016
(Continued)

OTHER PUBLICATIONS

International Search Report issued by the State Intellectual Property Office of the P.R. China for corresponding International Patent Application No. PCT/CN2016/111799, dated Sep. 6, 2017, with an English translation.

(Continued)

*Primary Examiner* — Kodzovi Acolatse
(74) *Attorney, Agent, or Firm* — Myers Wolin, LLC

(57) ABSTRACT

An uplink transmission control method and apparatus and a communication system. The network device explicitly or implicitly indicates dynamic scheduling information of RACH resources via control signaling. After selecting RACH resources, the user equipment (UE) monitors control signaling corresponding to the RACH resources. According to situations of receiving the control signaling, when the selected RACH resources are available, the UE directly transmits a random access request matched with the RACH resources; and when the selected RACH resources are unavailable, the UE further selects RACH resources according to configuration or indication of a base station, and until an RACH resource is available, the UE transmits a random access request matched with the RACH resource. Hence, normal random access of the UE may be ensured, and interference to other UEs may be reduced.

12 Claims, 11 Drawing Sheets

(51) Int. Cl.
*H04W 72/04* (2009.01)
*H04L 5/00* (2006.01)
*H04W 74/00* (2009.01)

(52) U.S. Cl.
CPC ..... *H04L 27/2666* (2013.01); *H04W 72/0446* (2013.01); *H04W 74/0833* (2013.01); *H04L 5/0053* (2013.01); *H04W 74/006* (2013.01)

(56) References Cited

U.S. PATENT DOCUMENTS

| | | | |
|---|---|---|---|
| 2014/0086112 A1* | 3/2014 | Stern-Berkowitz | H04W 72/1289 370/280 |
| 2014/0204783 A1 | 7/2014 | Lin et al. | |
| 2015/0016312 A1* | 1/2015 | Li | H04W 74/0833 370/280 |
| 2015/0023231 A1* | 1/2015 | Ji | H04W 72/1289 370/280 |
| 2015/0245247 A1* | 8/2015 | Chen | H04L 5/14 370/280 |
| 2015/0358138 A1 | 12/2015 | Hwang et al. | |
| 2015/0372798 A1 | 12/2015 | Zhao et al. | |
| 2016/0037352 A1* | 2/2016 | Wei | H04W 74/0833 455/454 |
| 2016/0150541 A1* | 5/2016 | Park | H04W 72/0453 370/329 |
| 2016/0255489 A1 | 9/2016 | Seo et al. | |
| 2016/0329981 A1* | 11/2016 | Chung | H04H 20/38 |
| 2016/0374079 A1* | 12/2016 | Yasukawa | H04B 7/2615 |
| 2017/0273056 A1* | 9/2017 | Papasakellariou | H04W 52/281 |
| 2018/0115430 A1* | 4/2018 | Seo | H04W 88/02 |
| 2018/0220466 A1* | 8/2018 | Park | H04W 74/0833 |
| 2018/0263059 A1* | 9/2018 | Rosa | H04L 5/001 |
| 2018/0368105 A1* | 12/2018 | Frederiksen | H04W 72/02 |
| 2019/0029050 A1* | 1/2019 | Li | H04L 5/1469 |
| 2019/0082472 A1* | 3/2019 | Zhang | H04W 74/006 |
| 2019/0116615 A1* | 4/2019 | Harada | H04W 16/14 |
| 2019/0124687 A1* | 4/2019 | Yang | H04L 27/26 |
| 2019/0150171 A1* | 5/2019 | Hwang | H04L 1/1819 370/329 |

FOREIGN PATENT DOCUMENTS

| | | |
|---|---|---|
| CN | 106165329 A | 11/2016 |
| JP | 2013501463 A | 1/2013 |
| JP | 2016510560 A | 4/2016 |
| JP | 2016536866 A | 11/2016 |
| KR | 10-2014-0141575 A | 12/2014 |
| KR | 10-2015-0113187 A | 10/2015 |
| KR | 10-2016-0030252 A | 3/2016 |

OTHER PUBLICATIONS

Written Opinion of the International Searching Authority issued by the State Intellectual Property Office of the P.R. China for corresponding International Patent Application No. PCT/CN2016/111799, dated Sep. 6, 2017, with an English translation.
Mediatek Inc., "Support for legacy UEs in adaptive TDD systems", Agenda Item: 7.3.3.4, 3GPP TSG-RAN WG1 Meeting #72, R1-130217, St. Julian's, Malta, Jan. 28-Feb. 1, 2012.
Notice of Preliminary Rejection by the Korean Intellectual Property Office issued for corresponding Korean Patent Application No. 10-2019-7014326, dated Mar. 23, 2020, with an English translation.
Extended European Search Report issued by the European Patent Office for corresponding European Patent Application No. 16924265.8 dated Jun. 26, 2020.
Samsung: "Random Access in NR—Flexible UE Bandwidth Aspects", 3GPP Draft; R2-167569 Random Access-UE Channel Bandwidth Aspects, 3RD Generation Partnership Project (3GPP), Mobile Competence Centre; 650 Route Des Lucioles ; F-06921 Sophia-Antipolis Cedex Franc vol. RAN WG2, No. Reno, USA; Nov. 14, 2016-Nov. 18, 2016, Nov. 4, 2016; [Cited in Extended European Search Report issued by the European Patent Office for corresponding European Patent Application No. 16924265.8 dated Jun. 26, 2020].
Notice of Reasons for Refusal issued by the Japan Patent Office for corresponding Japanese Patent Application No. 2019-531798, dated Jun. 23, 2020, with full English translation attached.
Fujitsu, "Discussion on PRACH configuration in NR", 3GPP TSG RAN WG1 Meeting #87, R1-1611461, Reno, USA, Nov. 14-18, 2016.
Motorola Mobility, "Discussion on RACH numerology and procedure", 3GPP TSG RAN WG1 Meeting #87, R1-1612746, Reno, Nevada, USA, Nov. 14-18, 2016.
Examination Report issued by Intellectual Property India for corresponding Indian Patent Application 201937018321, dated Jan. 5, 2021, with an English translation.
Notice of Reasons for Refusal issued by the Japan Patent Office for corresponding Japanese Patent Application No. 2019-531798, dated Feb. 9, 2021, with an English translation.

\* cited by examiner 301
the network device explicitly or implicitly indicates dynamic scheduling information of random access channel (RACH) resources via control signaling
Fig. 3
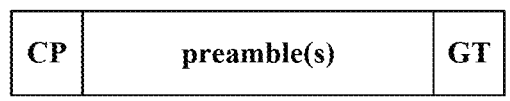
Fig. 4A
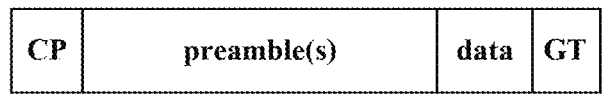
Fig. 4B
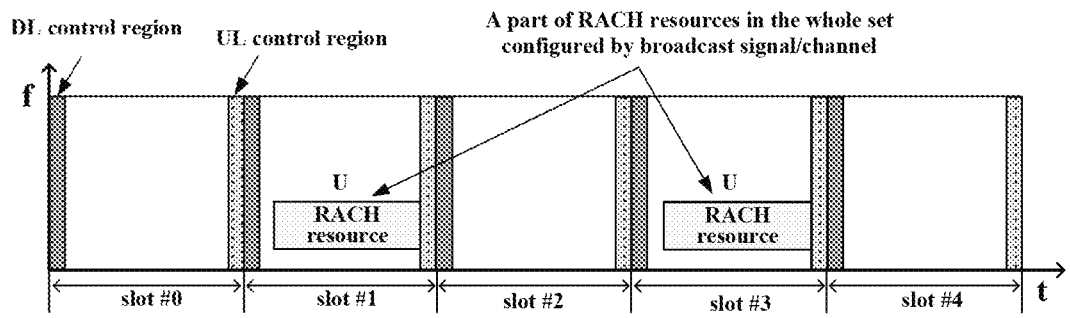
Fig. 5A

UPLINK TRANSMISSION CONTROL METHOD AND APPARATUS AND COMMUNICATION SYSTEM

CROSS REFERENCE TO RELATED APPLICATIONS

This application is a continuation application of International Application PCT/CN2016/111799 filed on Dec. 23, 2016, the entire contents of which are incorporated herein by reference.

FIELD

This disclosure relates to the field of communications, and in particular to an uplink transmission control method and apparatus and a communication system.

BACKGROUND

Long term evolution (LTE) supports two duplexing modes, frequency division duplexing (FDD) and time division duplexing (TDD), these two duplexing modes respectively supporting paired spectrum and non-paired spectrum. In a TDD operation, a cell achieves uplink and downlink transmission at an individual carrier frequency in a time division manner. In order to be adapted for different uplink and downlink flow proportion, the LTE supports seven uplink and/or downlink (UL/DL) configurations, and a cell informs a user equipment (UE) of a selected UL/DL configuration by broadcasting via a first system information block (SIB1). Generally speaking, the UL/DL configuration is relatively static, and the UL/DL configuration is permitted to be changed only at relatively long time intervals, so as to be adapted for changed traffic models.

As shown in FIG. 1, in order to be adapted for dynamic changes of traffic models, the LTE introduces enhanced interference management and traffic adaptation (eIMTA) in Release 12 (Rel-12), so as to support a frame-based UL/DL dynamic configuration. A base station, via UE-specific signaling, configures a UE supporting the eIMTA (briefly referred to as eIMTA UE) with an eIMTA radio network temporary identifier (eIMTA-RNTI), a physical downlink control channel (PDCCH) monitoring time and a reference UL/DL configuration. The eIMTA UE learns an actual UL/DL configuration at a current period by monitoring a PDCCH scrambled by an eIMTA-RNTI, and UE not supporting the eIMTA (briefly referred to as non-eIMTA UE) follows an UL/DL configuration configured in the SIB1.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In a process of study of future new radio (NR), the 3rd Generation Partnership Project (3GPP) defines a plurality of traffic types and application scenarios, such as ultra-reliable low latency communication (URLLC), and proposes dynamic TDD to be further adapted for dynamic changes of traffic models and meet demands of different traffic types for communications. The dynamic TDD may dynamically configure UL/DL transmission directions based on a slot (or a mini-slot or a sub-slot). Such a manner for flexibly configuring UL/DL transmission directions may have an effect on availability of statically or semi-statically configured uplink resources in a cell. For example, as shown in FIG. 2, time-domain positions of static or semi-static random access channel (RACH) resources preconfigured via broadcast signals and/or broadcast channels and/or other channels may possibly be dynamically adjusted into downlink transmissions, and the base station is unable to, on corresponding RACH resources, receive a random access request transmitted by the UE. If the UE still transmits a random access request at these positions, the random access request will certainly fail, and extra access latency may possibly be introduced. And on the other hand, uplink transmission of the UE may possibly interfere with other UEs receiving downlink data.

On account of the above scenarios, and in order to ensure normal random access of the UE and reduce interference to other UEs, embodiments of this disclosure provide an uplink transmission control method and apparatus and a communication system.

According to a first aspect of the embodiments of this disclosure, there is provided an uplink transmission control method, including:

explicitly or implicitly indicating dynamic scheduling information of random access channel (RACH) resources via control signaling.

According to a second aspect of the embodiments of this disclosure, there is provided an uplink transmission control method, including:

monitoring control signaling corresponding to selected RACH resources by UE before using the selected RACH resources; and determining available RACH resources by the UE according a result of monitoring the control signaling;

wherein, a network device explicitly or implicitly indicates dynamic scheduling information of the RACH resources via the control signaling.

According to a third aspect of the embodiments of this disclosure, there is provided an uplink transmission control apparatus, including:

a first indicating unit configured to explicitly or implicitly indicate dynamic scheduling information of random access channel (RACH) resources via control signaling.

According to a fourth aspect of the embodiments of this disclosure, there is provided an uplink transmission control apparatus, including:

a monitoring unit configured to monitor control signaling corresponding to selected RACH resources before using the selected RACH resources; and a first determining unit configured to determine available RACH resources according a result of monitoring the control signaling;

wherein, a network device explicitly or implicitly indicates dynamic scheduling information of the RACH resources via the control signaling.

According to a fifth aspect of the embodiments of this disclosure, there is provided a network device, including the apparatus as described in the third aspect.

According to a sixth aspect of the embodiments of this disclosure, there is provided a UE, including the apparatus as described in the fourth aspect.

According to a seventh aspect of the embodiments of this disclosure, there is provided a communication system, including the network device as described in the fifth aspect and the UE as described in the sixth aspect.

According to an eighth aspect of the embodiments of this disclosure, there is provided a computer readable program, which, when executed in an uplink transmission control apparatus or a network device, will cause the uplink transmission control apparatus or the network device to carry out the uplink transmission control method as described in the first aspect.

According to a ninth aspect of the embodiments of this disclosure, there is provided a computer storage medium, including a computer readable program, which will cause an uplink transmission control apparatus or a network device to carry out the uplink transmission control method as described in the first aspect.

According to a tenth aspect of the embodiments of this disclosure, there is provided a computer readable program, which, when executed in an uplink transmission control apparatus or a UE, will cause the uplink transmission control apparatus or the UE to carry out the uplink transmission control method as described in the second aspect.

According to an eleventh aspect of the embodiments of this disclosure, there is provided a computer storage medium, including a computer readable program, which will cause an uplink transmission control apparatus or a UE to carry out the uplink transmission control method as described in the second aspect.

An advantage of the embodiments of this disclosure exists in that with the method, apparatus and system of the embodiments of this disclosure, normal random access of the UE may be ensured, and interference to other UEs may be reduced.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, blocks, steps or components but does not preclude the presence or addition of one or more other features, integers, blocks, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 3 is a schematic diagram of the uplink transmission control method of Embodiment 1;

FIG. 4A is an example of RACH resources transmitting preambles only;

FIG. 4B is an example of RACH resources transmitting preambles and data;

FIG. 5A is a schematic diagram of a configuration of a set of static or semi-static RACH resources;

DETAILED DESCRIPTION

Figure 1:
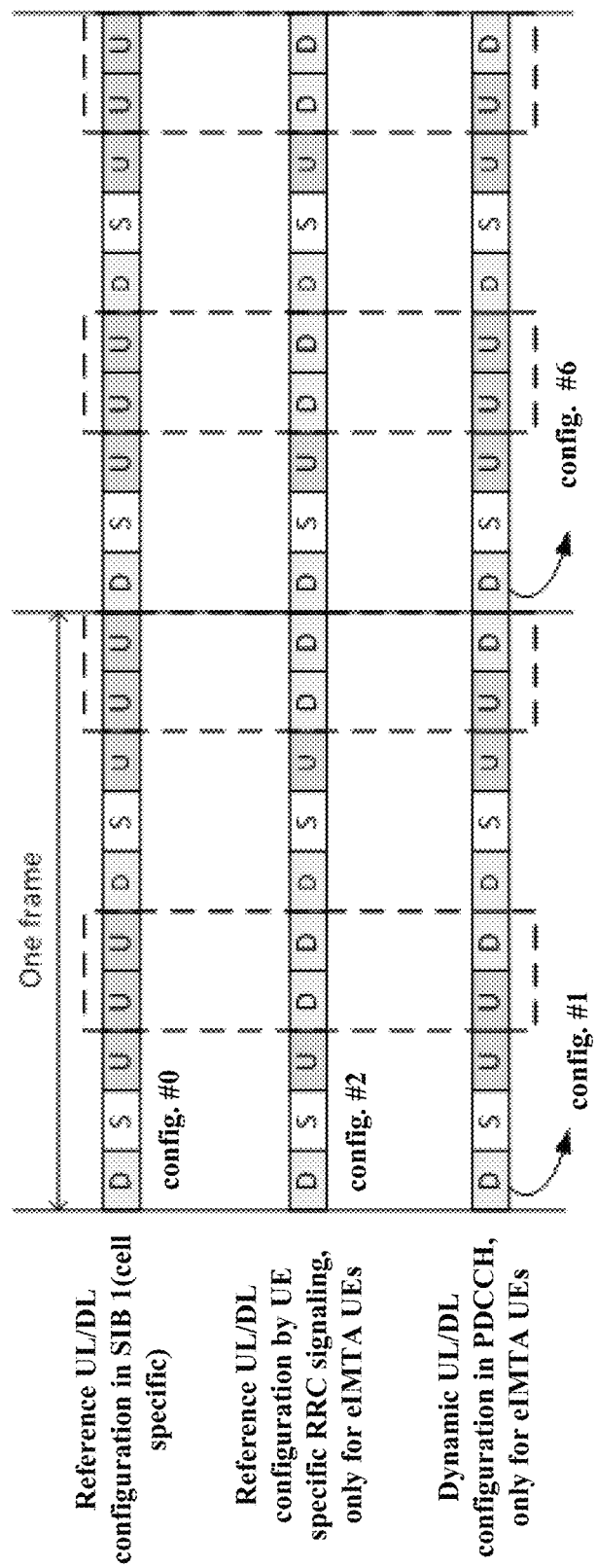
FIG. 1 is a schematic diagram of TDD eIMTA UL/DL configurations.
Figure 2:
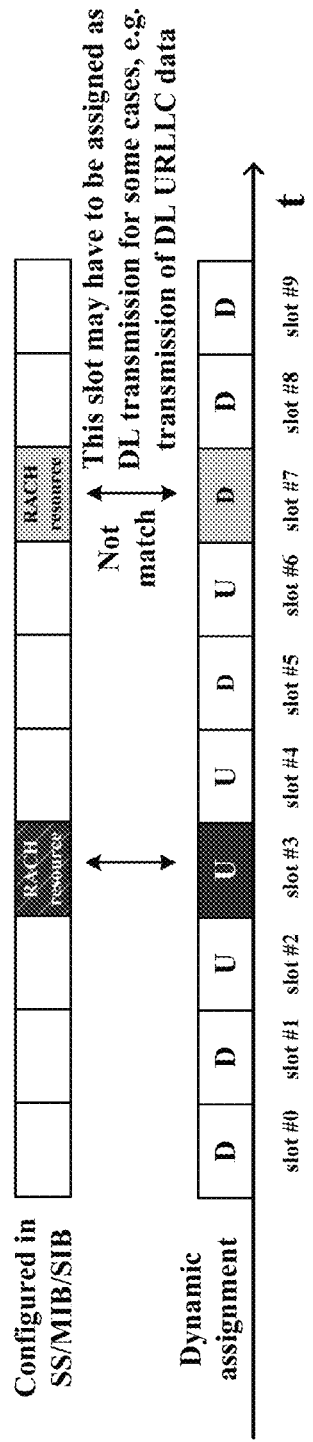
FIG. 2 is a schematic diagram of a problem of unavailability of RACH resources in dynamic TDD.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

In the embodiment, the base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

In the embodiment, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, the network device explicitly or implicitly indicates dynamic scheduling information of RACH resources via control signaling. The user equipment (UE) selects RACH resources and monitors control signaling corresponding to the RACH resources. According to situations of receiving the control signaling, when the selected RACH resources are available, the UE directly transmits a random access request matched with the RACH resources; and when the selected RACH resources are unavailable, the UE further selects RACH resources according to configuration or indication of a base station, and until an RACH resource is determined to be available, the UE transmits a random access request matched with the RACH resource. Hence, normal random access of the UE may be ensured, and interference to other UEs may be reduced.

In the embodiments of this disclosure, the random access request may be carried by a message 1 (msg1), and may include preambles, or preambles and data, such as a UE_ID.

The embodiments of this disclosure shall be described below with reference to the accompanying drawings.

Embodiment 1

The embodiment provides an uplink transmission control method, applicable to a network device. FIG. 3 is a schematic diagram of the method. As shown in FIG. 3, the method includes:

block 301: the network device explicitly or implicitly indicates dynamic scheduling information of random access channel (RACH) resources via control signaling.

In an embodiment, for a preconfigured set of RACH resources and/or set of preambles, the network device explicitly or implicitly indicates the dynamic scheduling information of the RACH resources via the control signaling, and the UE may select RACH resources according the dynamic scheduling information, so as to transmit a random access request, thereby avoiding a problem of failure of random access due to transmitting the random access request by the UE on RACH resources that are scheduled as downlink at all or part of time-domain positions and avoiding interference to a UE receiving downlink data, ensuring normal random access of the UE, and reducing interference to other UEs.

In an embodiment, in order to support the random access of the UE, the network device may preconfigure a set of RACH resources and/or a set of preambles, such as statically or semi-statically configuring the set of RACH resources and/or the set of preambles via broadcast signals and/or broadcast channels and/or other channels; wherein, the broadcast signals may be synchronization signals, such as a primary synchronization signal (PSS) and/or a secondary synchronization signal (SSS), a new radio primary synchronization signal (NR-PSS) and/or a new radio secondary synchronization signal (NR-SSS); the broadcast channels may be, for example, a physical broadcast channel (PBCH), a new radio physical broadcast channel (NR-PBCH), a new radio physical broadcast channel 1 (NR-PBCH_1), and a new radio physical broadcast channel 2 (NR-PBCH_2), etc.; and other channels may be, for example, a physical downlink shared channel (PDSCH), and a new radio physical downlink shared channel (NR-PDSCH), etc.; however, the embodiment is not limited thereto. In an embodiment, there may exist a fixed mapping relationship between the above preambles (or the set of preambles) and the RACH resources (or the set of RACH resources), and when the network device configures only the preambles (or the set of preambles), RACH resources (or the set of RACH resources) to which they correspond are implicitly configured by default.

In an embodiment, the network device may configure RACH resources of a single type at the same time-domain position, and may also configure RACH resources of a plurality of types at the same time-domain position. And different types of RACH resources may occupy different time lengths and/or frequency-domain widths and/or numbers of subcarriers, may employ different numerologies, or may be used for transmitting different preambles, or may be used for transmitting different preambles and data, such an a UE_ID, etc.

FIG. 4A shows an example of RACH resources transmitting preambles, and FIG. 4b shows an example of RACH resources transmitting preambles and data, such an a UE_ID, etc.; however, the embodiment is not limited to the structures shown in FIGS. 4A and 4B.

Figure 5B:
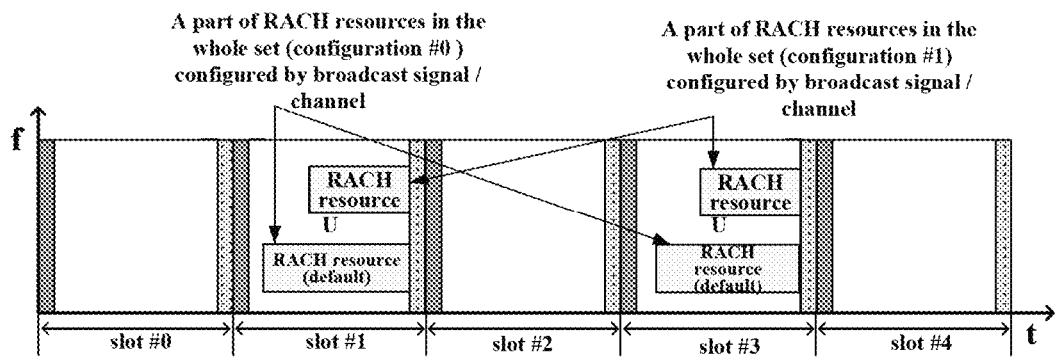
FIG. 5B is another schematic diagram of the configuration of a set of static or semi-static RACH resources.

It should be noted that different types of RACH resources may be deemed as being located at the same time-domain position when they are overlapped at the time domain. Taking a slot-based self-contain structure as an example, a set of statically/semi-statically configured RACH resources in a cell may be as shown in FIGS. 5A and 5B. Here, the self-contain structure refers to that a single resource scheduling unit (such as a subframe, a slot, a mini-slot, or a sub-slot) contains uplink/downlink control areas and data areas. However, the embodiment is not limited to a self-contain structure, neither is limited to relative positions of the areas in the self-contain structure shown in FIGS. 5A and 5B.

In FIG. 5A, the network device configures only a single type of RACH resources at the same time-domain position.

In FIG. 5B, the network device may support or configure a plurality of types of RACH resources at the same time-domain position, such as RACH resources corresponding to configuration #0 and RACH resources corresponding to configuration #1; wherein, time length, and the numbers of occupied subcarriers, of the RACH resources based on the configuration #0 and configuration #1, may be different. In the embodiment, different types of RACH resources may possibly correspond to different preamble configurations. For example, RACH resources with relatively short time lengths or relatively few occupied subcarriers may possibly correspond to relatively short preamble sequences and/or relatively few times of repeated transmission of preamble sequences. For another example, RACH resources used for transmitting preambles only and used for transmitting preambles and data, such as a UE_ID, correspond to different preamble sequences and/or correspond to different times of repeated transmission of preamble sequences. Here, the different preamble sequences may be, for example, different root sequences, cyclic shift length, sequence lengths, etc.

In FIGS. 5A and 5B, the RACH resources occupying a plurality of symbols (a part of the resource scheduling unit) is taken as an example. However, the embodiment is not limited thereto, and the RACH resources may be configured to occupy a plurality of resource scheduling units as actually demanded, such as occupying a plurality of subframes, or a plurality of slots (or mini-slots or sub-slots)

In an embodiment, in order to be adapted for factors, such as dynamic changes of traffic models, and demands of different traffic types for communications, the network device may possibly dynamically configure uplink/downlink transmission directions, which may make that all or part of the time-domain positions of the preconfigured static or semi-static RACH resources are dynamically adjusted into downlink transmission, resulting in that the RACH resources are unable to be normally used for transmission of random access requests. In block 301, in order to ensure normal random access of all UEs to be randomly accessed and reduce interference to other UEs, the network device may explicitly or implicitly indicate the dynamic scheduling information of the RACH resources via the control signaling (such as a PDCCH, and an NR-PDCCH), so that after selecting the RACH resources, the UE determines whether the RACH resources are available according to a situation of receiving the control signaling (whether the control signaling is received), or according to the dynamic scheduling information of the RACH resources (in a case where the control signaling is received), by monitoring the control signaling corresponding to the selected RACH resources. "The control signaling" here is a collective name, and contains all contents executing a control function, such as a signal, a channel, and a message, that is, in some implementations, the control signaling may also be referred to as a control channel or a control signal or a control message, which are collectively referred to as control signaling, for the convenience of description.

In an embodiment, the above UE to be randomly accessed may be in RRC_IDLE, RRC_CONNECTED states; wherein, the RRC_CONNECTED state includes an RRC_ACTIVE state, and an RRC_INACTIVE state, etc.

In one implementation of block 301, the network device may indicate the dynamic scheduling information of the RACH resources by indicating whether the RACH resources are available. That is, in the implementation, the network device may explicitly or implicitly indicate whether the RACH resources are available via the control signaling, thereby indicating the dynamic scheduling information of the RACH resources, namely, indicating whether the UE needs to autonomously select RACH resources other than unavailable resources in the above set of RACH resources.

In an example of the implementation, whether the RACH resources are available may be implicitly indicated via a transmission configuration. The transmission configuration, for example, may contain transmission direction information, via which transmission directions of the time-domain positions of the RACH resources being indicated. With the transmission direction information, the network device may implicitly inform the UE of whether an RACH resource at a time-domain position is available. The embodiment is not limited thereto, and in an example, whether the RACH resources are available may also be implicitly indicated via other indication information in the transmission configuration.

In this example, a transmission direction may be indicated via a control signaling format, control signaling presence, and a control signaling content, etc., that is, the transmission direction information may be a control signaling format, control signaling presence, and a control signaling content, etc.

For example, the network device may indicate that a corresponding time-domain position is downlink transmission via DCI format 1, and indicate that a corresponding time-domain position is uplink transmission via DCI format 0. When a control signaling format detected by a UE is DCI format 1, it may learn that a corresponding time-domain position is downlink transmission, and the UE needs to select an RACH resource of another time-domain position in the set of RACH resources.

In another example of the implementation, whether the RACH resources are available may be indicated by indicating whether preambles and data are permitted to be transmitted in the random access request. With this indication information, the network device may implicitly inform the UE of whether an RACH resource at a time-domain position supporting transmission of preambles and data is available. For example, when the UE detects that the control signaling does not permit to transmit preambles and data in the random access request, it may learn that RACH resources used for transmitting preambles and data are unavailable, and RACH resources transmitting preambles only need to be reselected.

In a further example of the implementation, whether the RACH resources are available may be explicitly indicated via RACH resource indication information, that is, the network device directly indicates whether the RACH resources are available via the RACH resource indication information.

In this example, whether the RACH resources are available may likewise be indicated via a control signaling format, control signaling presence, and a control signaling content, etc. For example, not transmitting the above RACH resource indication information denotes that the RACH resources are available. And when it is indicated that the RACH resources are unavailable, the UE may autonomously select other RACH resources in the set of RACH resources configured by the network device.

Figure 6:
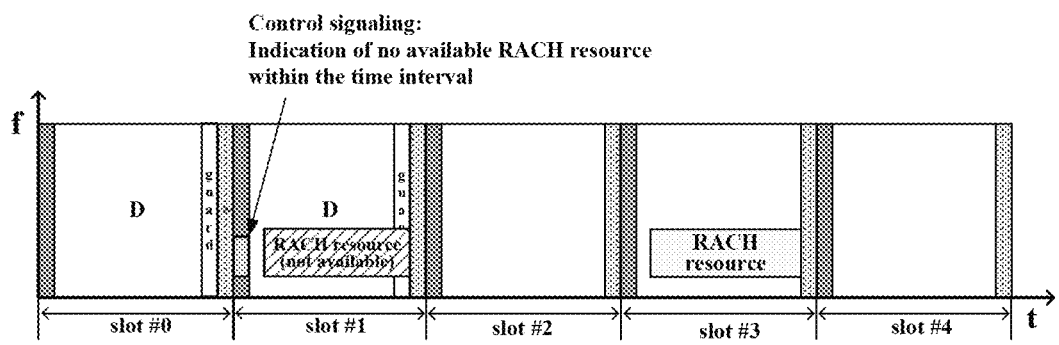
FIG. 6 is a schematic diagram of RACH resource availability indication.
Figure 7:
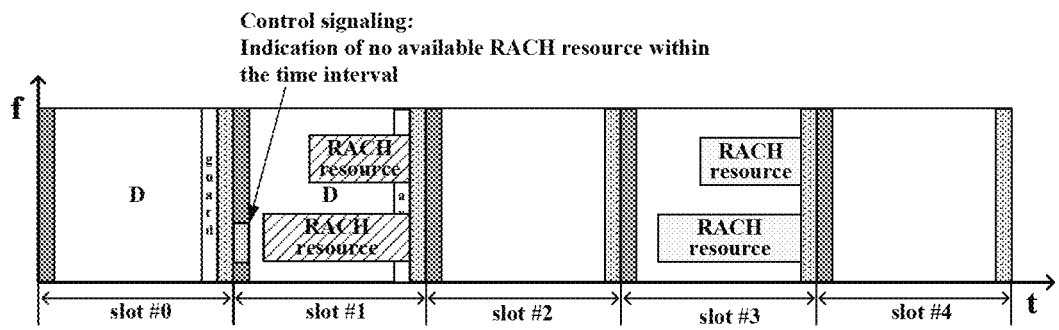
FIG. 7 is another schematic diagram of the RACH resource availability indication.
Figure 8:
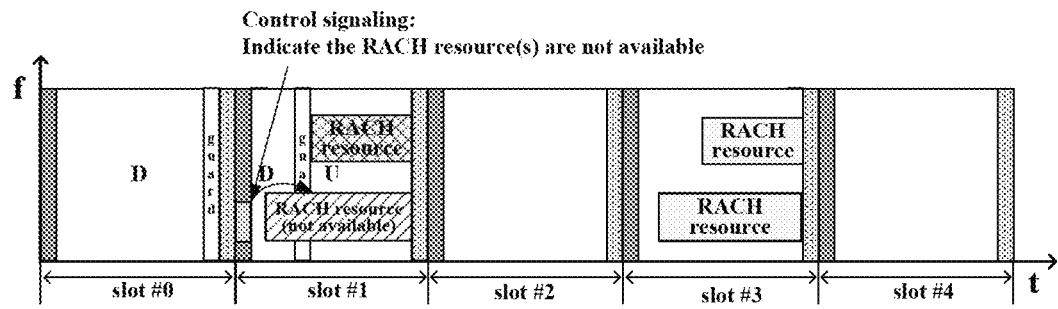
FIG. 8 is a further schematic diagram of the RACH resource availability indication.

FIGS. 6-8 show three examples of indicating the RACH resources via the implementation. As shown in FIGS. 6 and 7, the network device indicates at slot #1 that the RACH resources within this time interval are unavailable via the control signaling, that is, there exists no available RACH resource within this time interval, and the RACH resources at slot 3 are optional. As shown in FIG. 8, the network device indicates unavailable RACH resources (relatively long RACH resources at slot #1 in FIG. 8) at slot #1 via the control signaling, and at slot #1, there exists an RACH resource that is available (a relatively short RACH resource at slot #1 in FIG. 8); and the RACH resources at slot 3 are optional.

In an implementation, block 301 is described by taking indicating the transmission direction or the unavailable RACH resources as an example. However, the embodiment is not limited thereto, and in particular implementation, whether an RACH resource at a time-domain position is available may be implicitly indicated via other indication information.

In another implementation of block 301, the network device indicates the dynamic scheduling information of the RACH resources by indicating the available RACH resources. That is, in an implementation, the network device may explicitly or implicitly indicate the available RACH resources via the control signaling, thereby indicating the dynamic scheduling information of the RACH resources.

In the implementation, the network device may, via the control signaling, indicate RACH resources that should be used by the UE to be randomly accessed (assigned RACH resources). For example, the network device may inform (explicitly indicate) the UE of the assigned RACH resources via the control signaling. For another example, the network device may indicate (implicitly indicate) the available RACH resources according to correspondences between RACH resources and preambles by using the control signaling and indicating preambles matched with RACH resources, that is, the available RACH resources are implicitly indicated by the dynamic configuration information of the preambles. For a further example, the network device may indicate the available RACH resources by indicating whether preambles and data are permitted to be transmitted in a random access request.

Figure 9:
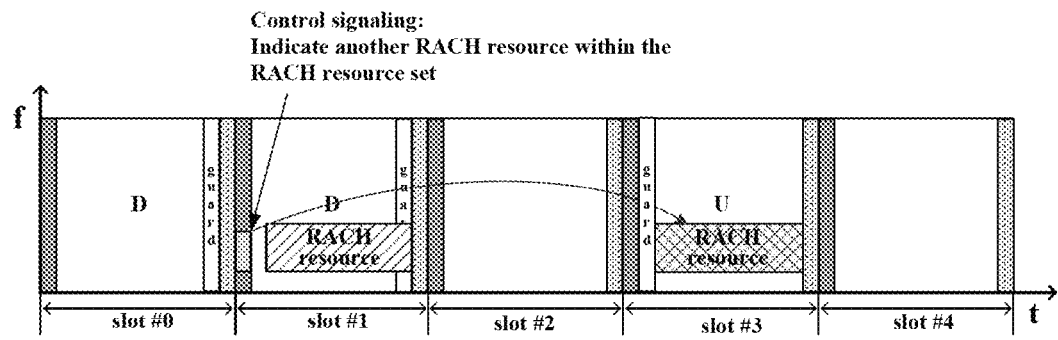
FIG. 9 is a schematic diagram of RACH resource assignment.
Figure 10:
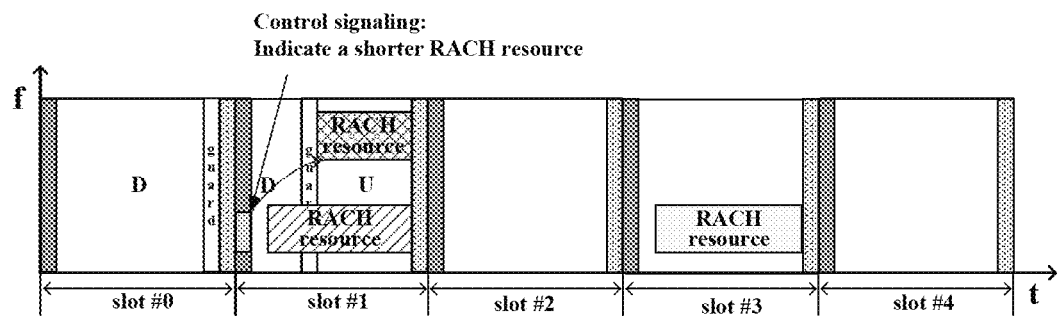
FIG. 10 is another schematic diagram of the RACH resource assignment.
Figure 11:
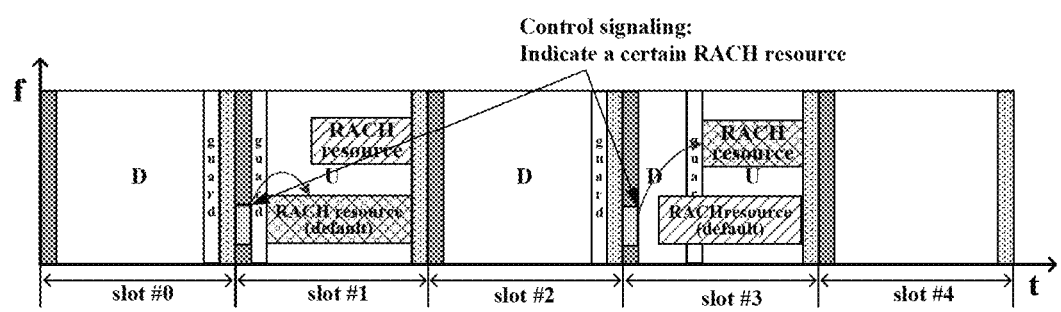
FIG. 11 is a further schematic diagram of the RACH resource assignment.

FIGS. 9-11 show three examples of indicating the RACH resources via this implementation. In FIG. 9, the UE is assigned to use another RACH resource in the preconfigured set of RACH resources, in FIG. 10, the UE is assigned to use RACH resources out of the preconfigured set of RACH resources, and in FIG. 11, which type of RACH resource at a time-domain position is used is assigned. As shown in FIG. 9, at slot #1, the network device indicates RACH resources within slot #3 via the control signaling; then, the RACH resources within slot #3 are taken as RACH resources assigned by the network device, and the UE to be randomly accessed may transmit a corresponding random access request by using the RACH resources. As shown in FIG. 10, at slot #1, the network device, via the control signaling, configures relatively short RACH resources out of the set of RACH resources preconfigured at slot #1; then, the relatively short RACH resources are taken as RACH resources assigned by the network device, and the UE to be randomly accessed may transmit a corresponding random access request by using the RACH resources. As shown in FIG. 11, at slot #1, the network device indicates relatively long RACH resources via the control signaling; then, the relatively long RACH resources are taken as RACH resources assigned by the network device, and the UE to be randomly accessed may transmit a corresponding random access request by using the relatively long RACH resources; likewise, at slot #3, the network device indicates relatively short RACH resources via the control signaling; then, the relatively short RACH resources are taken as RACH resources assigned by the network device, and the UE to be randomly accessed may transmit a corresponding random access request by using the RACH resources.

In the implementation, when the preconfigured or default RACH resources are available, the network device may not transmit the control signaling. In such a manner, it is implicitly indicated that the preconfigured or default RACH resources are available RACH resources.

In the implementation, the network device may further, via the control signaling, dynamically configure preambles matched with the assigned RACH resources.

In the embodiment, the network device may further, via the above broadcast signal/broadcast channel or the above control signaling, explicitly or implicitly indicate whether the UE needs to monitor control signaling corresponding to the RACH resources selected by it before the UE uses initially selected or reselected RACH resources. Hence, the UE may determine available RACH resources according to whether the control signaling needs to be monitored, whether the control signaling is received, and/or contents (indication information) of the control signaling.

With the uplink transmission control method of this embodiment, normal random access of the UE may be ensured, and interference to other UEs may be reduced.

Embodiment 2

The embodiment provides an uplink transmission control method, which is applicable to a UE, and is processing at a UE side corresponding to the method of Embodiment 1, with contents identical to those in Embodiment 1 being not going to be described herein any further.

Figure 12:
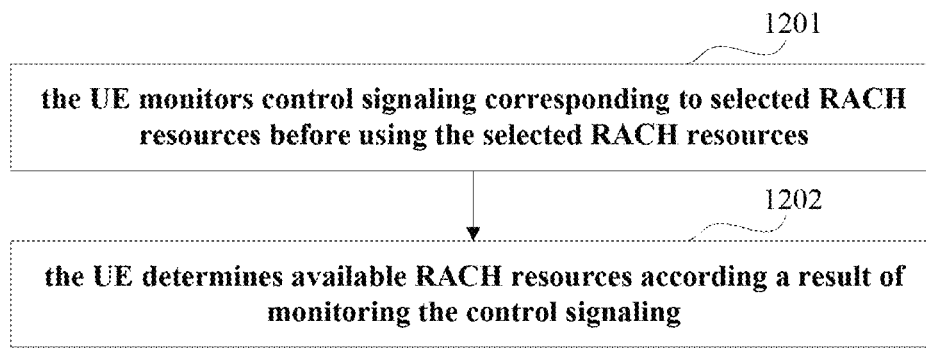
FIG. 12 is a schematic diagram of the uplink transmission control method of Embodiment 2.

FIG. 12 is a schematic diagram of the uplink transmission control method of this embodiment. As shown in FIG. 12, the method includes:

block 1201: the UE monitors control signaling corresponding to selected RACH resources before using the selected RACH resources; and block 1202: the UE determines available RACH resources according a result of monitoring the control signaling.

In an embodiment, a network device explicitly or implicitly indicates dynamic scheduling information of the RACH resources via the above control signaling, a manner of indicating being as described in Embodiment 1, and being not going to be described herein any further.

In an embodiment, a UE to be randomly accessed may select RACH resources in a set of RACH resources preconfigured by the network device. Here, reference may be made to Embodiment 1 for a manner for preconfiguring the set of RACH resources and contents thereof, which shall not be described herein any further.

In block 1201, the UE may determine according to indication or configuration of a base station whether it needs to monitor the control signaling; if it is determined that it needs not to monitor the control signaling, the UE may deem that the selected RACH resources are available, and transmit a random access request matched with the RACH resources by directly using the RACH resources; and if it is determined that it needs to monitor the control signaling, the UE may monitor the control signaling corresponding to the selected RACH resources before using the selected RACH resources, and determine the available RACH resources according to the result of monitoring the control signaling.

In block 1202, as the network device explicitly or implicitly indicates the dynamic scheduling information of the RACH resources via the above control signaling, the UE may determine the available RACH resources according to the result of monitoring the control signaling.

Figure 13:
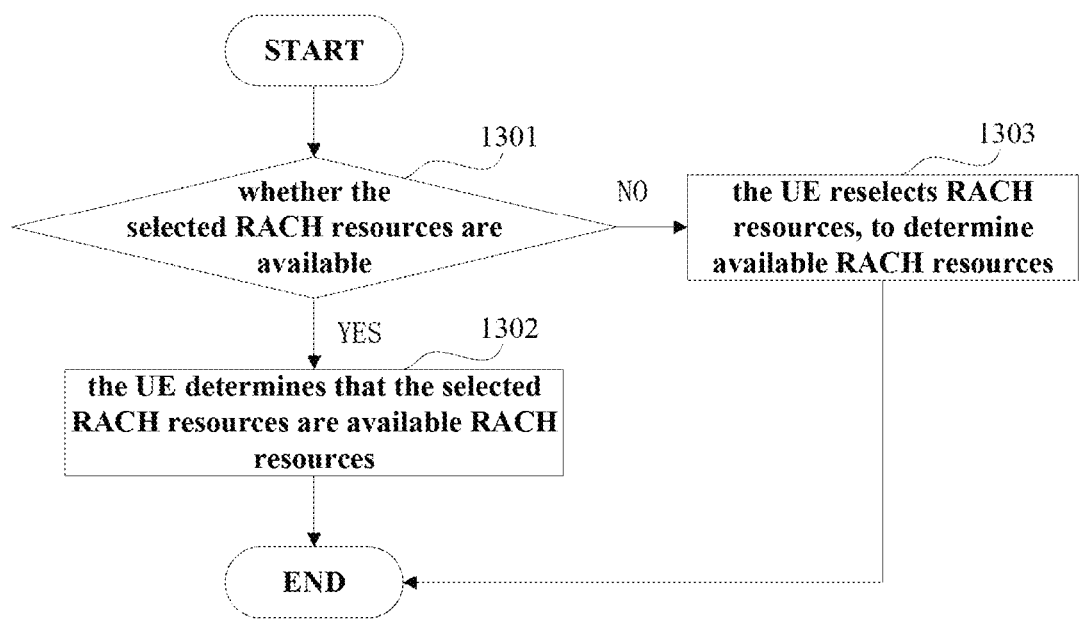
FIG. 13 is schematic diagram of an implementation of determining available RACH resources by the UE according to a result of monitoring control signaling in Embodiment 2.

FIG. 13 is schematic diagram of an implementation of determining the available RACH resources by the UE according to the result of monitoring the control signaling. As shown in FIG. 13, the method includes:

block 1301: the UE determines whether the selected RACH resources are available according to the control signaling, and executes block 1302 if it is yes, otherwise, executes block 1303;

block 1302: the UE determines that the selected RACH resources are available RACH resources; and block 1303: the UE reselects RACH resources, to determine available RACH resources.

In an implementation, as described in Embodiment 1, the control signaling indicates the dynamic scheduling information of the RACH resources by indicating whether the RACH resources are available or by indicating the available RACH resources, and the UE may determine whether the RACH resources selected by it are available according to the result of monitoring the control signaling. When the selected RACH resources are available, the UE may transmit the random access request matched with the resources by directly using the selected RACH resources; and when the selected RACH resources are unavailable, the UE may reselect RACH resources according to the control signaling transmitted by the network device (block 301 in FIG. 3 of Embodiment 1), until it deems that a selected RACH resource is available, and transmit the random access request matched with the RACH resources. Here, after reselecting the RACH resources, the UE may again determine whether it is needed to monitor the control signaling again, and the process in FIG. 13 is repeated, which shall not be described herein any further.

In the implementation, when the UE reselects the RACH resources, it may autonomously select RACH resources other than unavailable resources in the above set of RACH resources configured by the network device, or may select the available RACH resources indicated by the network device via the above control signaling, that is, selecting the above assigned RACH resources.

With the uplink transmission control method of this embodiment, normal random access of the UE may be ensured, and interference to other UEs may be reduced.

Figure 14:
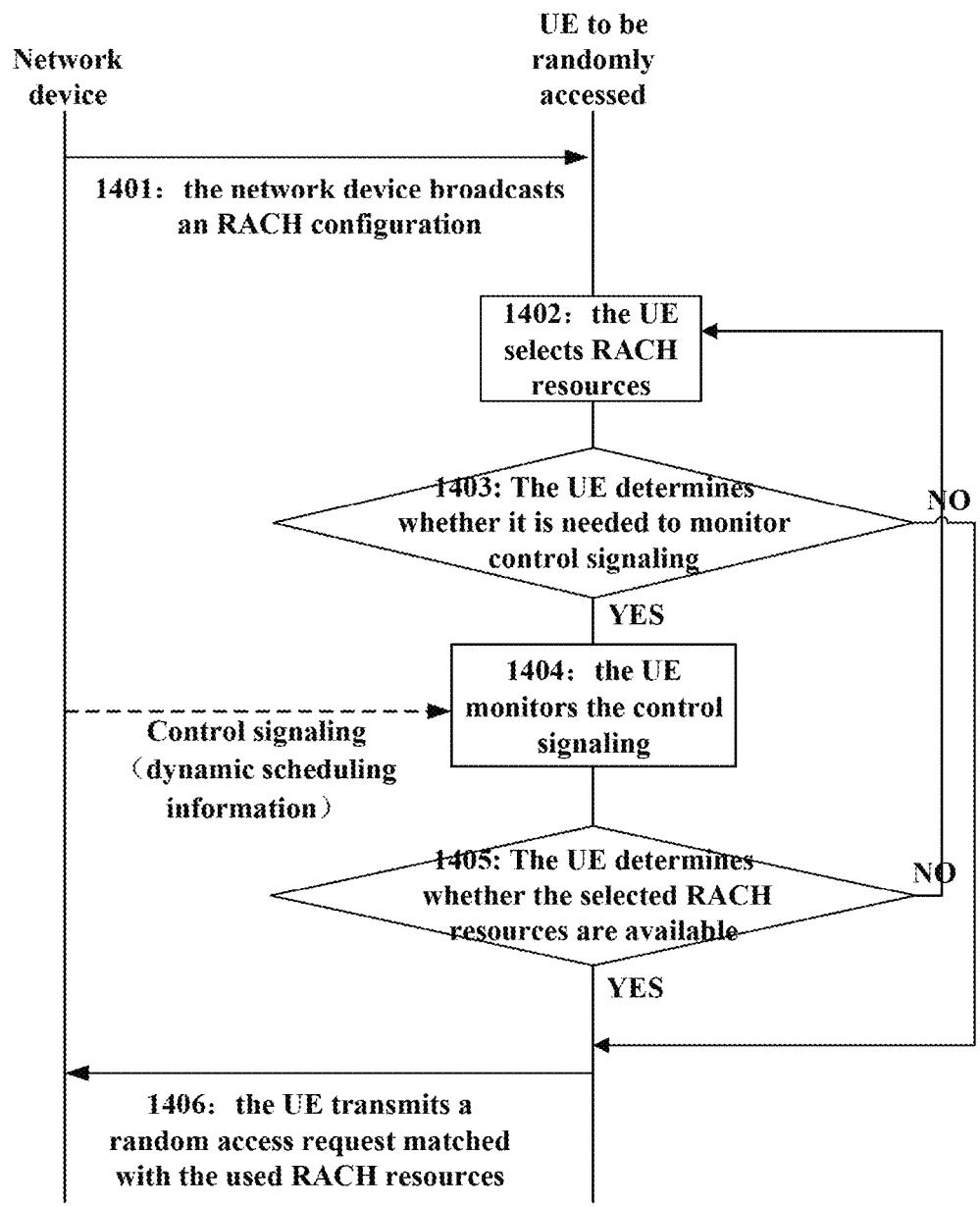
FIG. 14 is schematic diagram of information exchange between the network device and the UE.

The uplink transmission control method of this embodiment is described above respectively from the network device side and the UE side. FIG. 14 is schematic diagram of information exchange between the network device and the UE according to the uplink transmission control method of this embodiment. As shown in FIG. 14, the method includes:

block 1401: the network device broadcasts an RACH configuration, including a set of RACH resources and/or a set of preambles;

block 1402: the UE selects RACH resources;

block 1403: the UE determines whether it is needed to monitor control signaling, and executes block 1404 if it is yes, otherwise, executes block 1406;

block 1404: the UE monitors the control signaling;

block 1405: the UE determines whether the selected RACH resources are available, and executes block 1406 if it is yes, otherwise, turns back to block 1402;

block 1406: the UE transmits a random access request matched with the RACH resources by using the selected RACH resources.

In the embodiment of this disclosure, as shown in FIG. 14, the network device may explicitly or implicitly indicate the dynamic scheduling information of the RACH resources via the control signaling, hence, the UE may determine the available RACH resources according to whether to monitor the control signaling or according to the result of monitoring the control signaling, thereby ensuring normal random access of the UE, and reducing interference to other UEs.

Embodiment 3

This embodiment provides an uplink transmission control apparatus. As principles of the apparatus for solving problems are similar to that of the method in Embodiment 1, the implementation of the method in Embodiment 1 may be referred to for implementation of the apparatus, with identical contents being not going be described herein any further.

Figure 15:
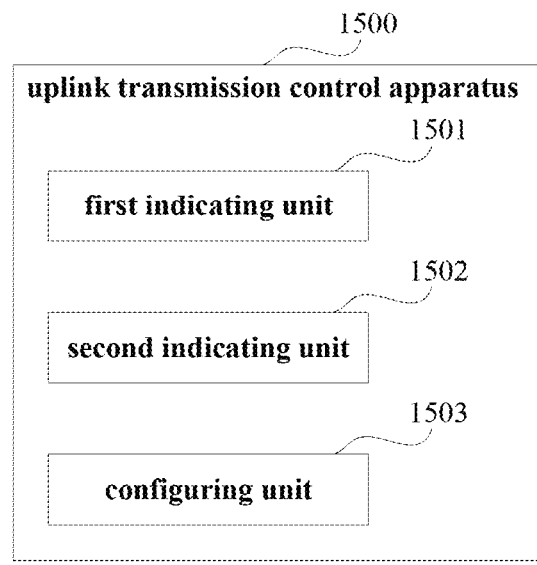
FIG. 15 is a schematic diagram of the uplink transmission control apparatus of Embodiment 3.

FIG. 15 is a schematic diagram of the uplink transmission control apparatus of this embodiment. As shown in FIG. 15, an uplink transmission control apparatus 1500 includes a first indicating unit 1501 configured to explicitly or implicitly indicate dynamic scheduling information of RACH resources via control signaling.

In an embodiment, manners for configuring a set of RACH resources and/or a set of preambles are as described in Embodiment 1, which shall not be described herein any further.

In an embodiment, the first indicating unit 1501 may indicate the dynamic scheduling information of the RACH resources by indicating whether the RACH resources are available. Here, whether the RACH resources are available may be implicitly indicated by transmission mode indication information in the control signaling, or explicitly indicated by RACH resource indication information in the control signaling, or implicitly indicated by indicating whether it is permitted to transmit preambles and data in a random access request. However, the embodiment is not limited thereto, and whether the RACH resources are available may also be indicated by other information in the control signaling.

In an embodiment, the first indicating unit 1501 may also indicate the dynamic scheduling information of the RACH resources by indicating available RACH resources. Here, the available RACH resources may be implicitly indicated by dynamic configuration information of preambles, or may be directly indicated. Alternatively, the first indicating unit 1501 may further configure, via the control signaling, preambles matching with the available RACH resources.

In an embodiment, as shown in FIG. 15, the apparatus 1500 may further include a second indicating unit 1502 configured to indicate whether UE needs to monitor control signaling corresponding to selected RACH resources before using the selected RACH resources.

In an embodiment, as shown in FIG. 15, the apparatus 1500 may further include a configuring unit 1503 configured to configure RACH resources of a single type at the same time-domain position, or configure RACH resources of a plurality of types at the same time-domain position.

In an embodiment, different types of RACH resources occupy different time lengths and/or frequency-domain widths and/or numbers of subcarriers, or different types of RACH resources employ different numerologies, or different types of RACH resources are used for transmitting different preambles, or different types of RACH resources are used for transmitting different preambles and data.

In an embodiment, different types of RACH resources correspond to different preamble configurations.

In an embodiment, as described above, the configuring unit 1503 may further configure a set of preambles, which shall not be described herein any further.

With the uplink transmission control apparatus of this embodiment, normal random access of the UE may be ensured, and interference to other UEs may be reduced.

Embodiment 4

This embodiment provides a network device, including the uplink transmission control apparatus 1500 as described in Embodiment 3.

Figure 16:
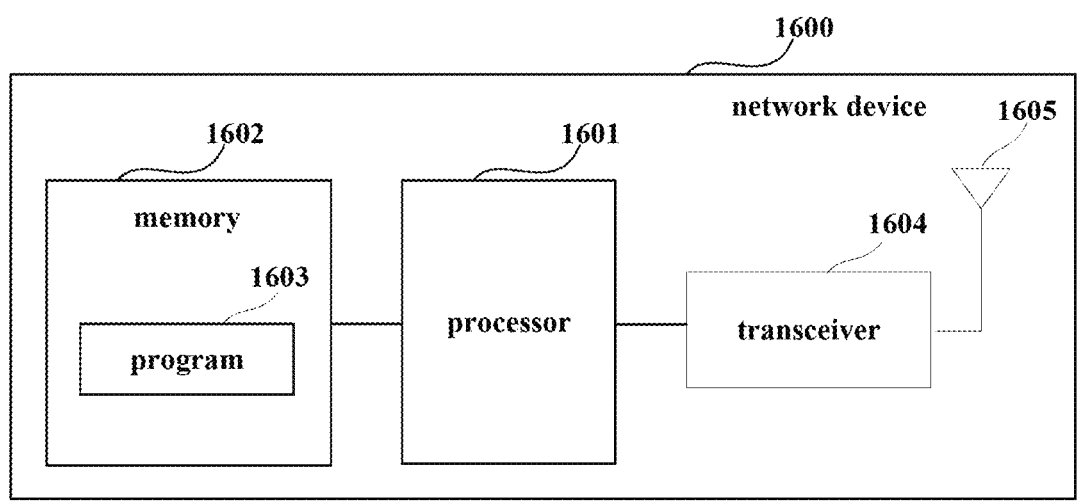
FIG. 16 is a schematic diagram of the network device of Embodiment 4.

FIG. 16 is a schematic diagram of the network device of this embodiment. As shown in FIG. 16, a network device 1600 may include a processor 1601 and a memory 1602, the memory 1602 being coupled to the processor 1601. The memory 1602 may store various data, and furthermore, it may store a program 1603 for information processing, and execute the program under control of the processor 1601, to receive various information transmitted by the UE, and transmit various information to the UE.

In one implementation, the functions of the uplink transmission control apparatus 1500 may be integrated into the processor 1601. The processor 1601 may be configured to: explicitly or implicitly indicate dynamic scheduling information of RACH resources via control signaling.

In an embodiment, the processor 1601 may be configured to: indicate the dynamic scheduling information of the RACH resources by indicating whether the RACH resources are available. Whether the RACH resources are available may be implicitly indicated by transmission mode indication information in the control signaling, or explicitly indicated by RACH resource indication information in the control signaling, or implicitly indicated by indicating whether it is permitted to transmit preambles and data in a random access request.

In an embodiment, the processor 1601 may be configured to: indicate the dynamic scheduling information of the RACH resources by indicating available RACH resources. The available RACH resources may be implicitly indicated by dynamic configuration information of preambles. Alternatively, the processor 1601 may further be configured to: configure, via the control signaling, preambles matching with the available RACH resources.

In an embodiment, the processor 1601 may further be configured to: indicate whether UE needs to monitor control signaling corresponding to selected RACH resources before using the selected RACH resources.

In another implementation, the uplink transmission control apparatus 1500 and the processor 1601 may be configured separately. For example, the uplink transmission control apparatus 1500 may be configured as a chip connected to the processor 1601, with its functions being realized under control of the processor 1601.

Furthermore, as shown in FIG. 16, the network device 1600 may further include a transceiver 1604, and an antenna 1605, etc. Functions of the above components are similar to those in the related art, and shall not be described herein any further. It should be noted that the network device 1600 does not necessarily include all the parts shown in FIG. 16, and furthermore, the network device 1600 may include parts not shown in FIG. 16, and the related art may be referred to.

With the network device of this embodiment, normal random access of the UE may be ensured, and interference to other UEs may be reduced.

Embodiment 5

This embodiment provides an uplink transmission control apparatus. As principles of the apparatus for solving problems are similar to that of the method in Embodiment 2, the implementation of the method in Embodiment 2 may be referred to for implementation of the apparatus, with identical contents being not going be described herein any further.

Figure 17:
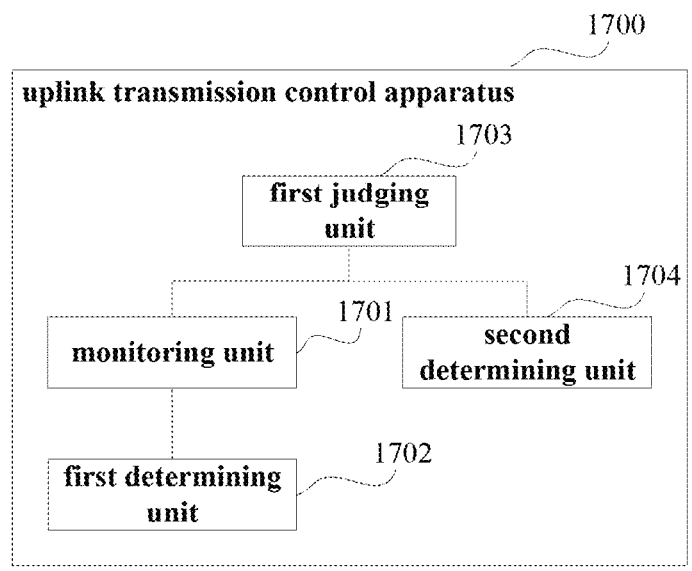
FIG. 17 is a schematic diagram of the uplink transmission control apparatus of Embodiment 5.

FIG. 17 is a schematic diagram of the uplink transmission control apparatus of this embodiment. As shown in FIG. 17, an uplink transmission control apparatus 1700 includes a monitoring unit 1701 and a first determining unit 1702. Before using selected RACH resources, the monitoring unit 1701 monitors control signaling corresponding to the selected RACH resources; and the first determining unit 1702 determines available RACH resources according a result of monitoring the control signaling. In an embodiment, a network device explicitly or implicitly indicates dynamic scheduling information of the RACH resources via the control signaling.

In one implementation of this embodiment, as shown in FIG. 17, the apparatus 1700 further includes:

a first judging unit 1703 configured to determine whether the network device indicates or configures monitoring control signaling corresponding to selected RACH resources before using the selected RACH resources. When it is yes determined by the first judging unit 1703, the monitoring unit 1701 monitors the control signaling corresponding to the selected RACH resources before using the selected RACH resources.

In one implementation of this embodiment, as shown in FIG. 17, the apparatus 1700 further includes:

a second determining unit 1704 configured to determine that the selected RACH resources are available RACH resources when it is no determined by the first judging unit 1703.

Figure 18:
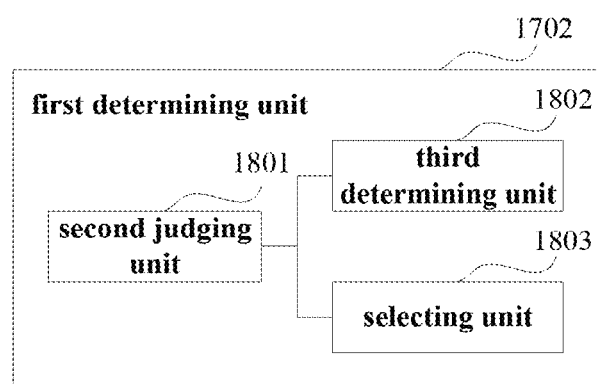
FIG. 18 is a schematic diagram of the first determining unit of Embodiment 5.

In an embodiment, as shown in FIG. 18, the first determining unit 1702 includes: a second judging unit 1801, a third determining unit 1802 and a selecting unit 1803. The second judging unit 1801 determines whether the selected RACH resources are available according to a result of monitoring the control signaling; the third determining unit 1802 determines that the selected RACH resources are available RACH resources when it is yes determined by the second judging unit 1801; and the selecting unit 1803 reselects RACH resources when it is no determined by the second judging unit 1801, to determine available RACH resources.

In an implementation, the selecting unit 1803 selects other RACH resources than unavailable RACH resources from a set of RACH resources configured by the network device, or selects available RACH resources indicated by the network device via the control signaling as the available RACH resources.

In an implementation, the control signaling indicates the dynamic scheduling information of the RACH resources by indicating whether the selected RACH resources are available or by indicating the available RACH resources.

With the uplink transmission control apparatus of this embodiment, normal random access of the UE may be ensured, and interference to other UEs may be reduced.

Embodiment 6

This embodiment provides a UE, including the uplink transmission control apparatus 1700 as described in Embodiment 5.

Figure 19:
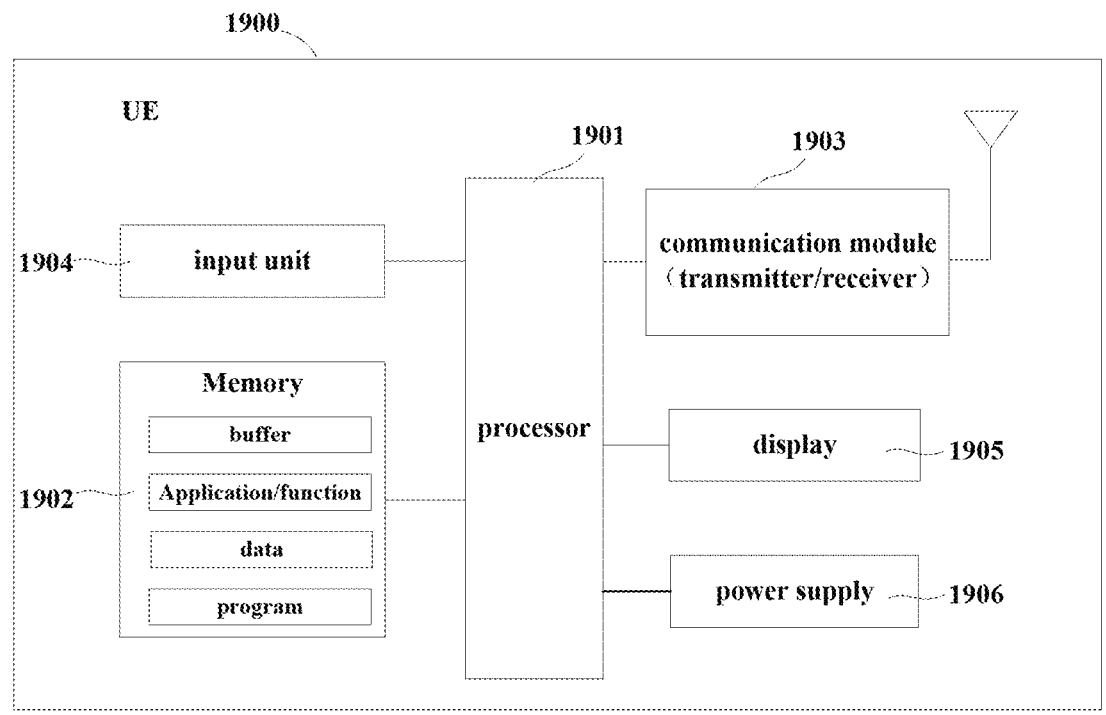
FIG. 19 is a schematic diagram of the UE of Embodiment 6.

FIG. 19 is a schematic diagram of a UE 1900 of this embodiment. As shown in FIG. 19, the UE 1900 may include a processor 1901 and a memory 1902, the memory 1902 being coupled to the processor 1901. It should be noted that this figure is illustrative only, and other types of structures may also be used, so as to supplement or replace this structure and achieve a telecommunications function or other functions.

In one implementation, the functions of the uplink transmission control apparatus 1700 may be integrated into the processor 1901. The processor 1901 may be configured to: monitor control signaling corresponding to selected RACH resources before using the selected RACH resources; and determine available RACH resources according a result of monitoring the control signaling. And a network device explicitly or implicitly indicates dynamic scheduling information of the RACH resources via the control signaling.

In an embodiment, the processor 1901 may be configured to: determine whether the network device indicates or configures monitoring control signaling corresponding to selected RACH resources before using the selected RACH resources; when it is yes, monitor the control signaling corresponding to the selected RACH resources before using the selected RACH resources; and determine that the selected RACH resources are available RACH resources when it is no.

In an embodiment, the processor 1901 may be configured to:

determine whether the selected RACH resources are available according to a result of monitoring the control signaling;

determine that the selected RACH resources are available RACH resources when it is yes; and reselect RACH resources when it is no, to determine available RACH resources.

In an embodiment, the control signaling indicates the dynamic scheduling information of the RACH resources by indicating whether the selected RACH resources are available or by indicating the available RACH resources.

In an embodiment, the processor 1901 may be configured to:

select other RACH resources than unavailable RACH resources from a set of RACH resources configured by the network device, or select available RACH resources indicated by the network device via the control signaling as the available RACH resources.

In another implementation, the uplink transmission control apparatus 1700 and the processor 1901 may be configured separately. For example, the uplink transmission control apparatus 1700 may be configured as a chip connected to the processor 1901, with its functions being realized under control of the processor 1901.

As shown in FIG. 19, the UE 1900 may further include a communication module 1903, an input unit 1904, a display 1905, and a power supply 1906. It should be noted that the UE 1900 does not necessarily include all the parts shown in FIG. 19, and furthermore, the UE 1900 may include parts not shown in FIG. 19, and the related art may be referred to.

As shown in FIG. 19, the processor 1901 is sometimes referred to as a controller or control, which may include a microprocessor or other processor devices and/or logic devices, and the processor 1901 receives input and controls operations of every component of the UE 1900.

In an embodiment, the memory 1902 may be, for example, one or more of a buffer memory, a flash memory, a hard drive, a mobile medium, a volatile memory, a nonvolatile memory, or other suitable devices, which may store various information, and furthermore, store programs executing related information. And the processor 1901 may execute programs stored in the memory 1902, so as to realize information storage or processing, etc. Functions of other parts are similar to those of the related art, which shall not be described herein any further. The parts of the UE 1900 may be realized by specific hardware, firmware, software, or any combination thereof, without departing from the scope of the present disclosure.

With the UE of this embodiment, normal random access of the UE may be ensured, and interference to other UEs may be reduced.

Embodiment 7

This embodiment provides a communication system, including the network device as described in Embodiment 4 and the UE as described in Embodiment 6.

Figure 20:
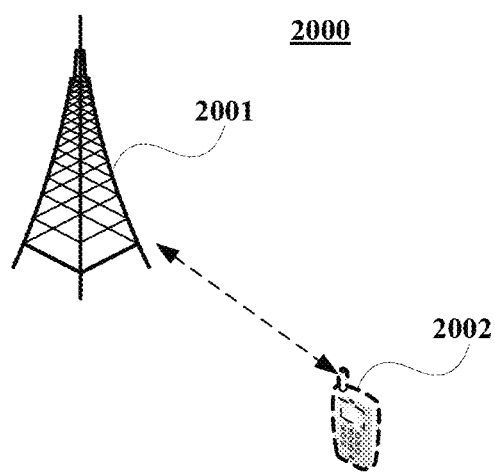
FIG. 20 is a schematic diagram of the communication system of Embodiment 7.

FIG. 20 is a schematic diagram of the communication system of this embodiment, in which a case where the UE and the network device are taken as an example is schematically shown. As shown in FIG. 20, the communication system 2000 may include a network device 2001 and a UE 2002 (for the sake of simplicity, FIG. 20 shall be described by taking only one UE as an example).

In an embodiment, existing traffics or traffics that may be implemented in the future may be performed between the network device 2001 and the UE 2002. For example, such traffics include but not limited to enhanced mobile broadband (eMBB), massive machine type communication (MTC), and ultra-reliable and low-latency communication (URLLC), etc.

In an embodiment, the UE 2002 may transmit data to the network device 2001, such as by using a grant-free transmission mode. The network device 2001 may receive data transmitted by one or more UEs 2002, and feedback information (such as acknowledgement (ACK)/non-acknowledgement (NACK) information) to the UE 2002, and according to the feedback information, the UE 2002 may determine to terminate a transmission process, or may perform new transmission of data, or may perform retransmission of data.

With the communication system of this embodiment, normal random access of the UE may be ensured, and interference to other UEs may be reduced.

Embodiment 8

This embodiment provides a method for configuring RACH resources, applicable to a network device. The method includes:

S1: the network device configures RACH resources of a single type at the same time-domain position, or configures RACH resources of a plurality of types at the same time-domain position.

In an embodiment, different types of RACH resources may occupy different time lengths and/or frequency-domain widths and/or numbers of subcarriers, or may employ different numerologies, or may be used for transmitting different preambles, or may be used for transmitting different preambles and data (such a UE_ID).

In an embodiment, different types of RACH resources may correspond to different preamble configurations.

As a manner of configuring the RACH resources by the network device is described in detail in Embodiment 1, the contents of which are incorporated herein, and shall not be described herein any further.

With the method of this embodiment, the network device may configure different types of RACH resources.

Embodiment 9

This embodiment provides an apparatus for configuring RACH resources. As principles of the apparatus for solving problems are similar to that of the method in Embodiment 8, the implementation of the method in Embodiment 8 may be referred to for implementation of the apparatus, with identical contents being not going be described herein any further.

In an embodiment, the apparatus includes:

a configuring unit configured to configure RACH resources of a single type at the same time-domain position, or configure RACH resources of a plurality of types at the same time-domain position.

In an embodiment, different types of RACH resources may occupy different time lengths and/or frequency-domain widths and/or numbers of subcarriers, or may employ different numerologies, or may be used for transmitting different preambles, or may be used for transmitting different preambles and data (such a UE_ID).

In an embodiment, different types of RACH resources may correspond to different preamble configurations.

As a manner of configuring the RACH resources by the network device is described in detail in Embodiment 1, the contents of which are incorporated herein, and shall not be described herein any further.

With the apparatus of this embodiment, the network device may configure different types of RACH resources.

Embodiment 10

This embodiment provides a network device, including the apparatus for configuring RACH resources as described in Embodiment 9.

With the network device of this embodiment, different types of RACH resources may be configured.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or blocks as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 16 (such as the first indicating unit) may either correspond to software modules of procedures of a computer program, or correspond to hardware modules. Such software modules may respectively correspond to the blocks shown in FIG. 3. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. A method for configuring RACH resources, including:
configuring RACH resources of a single type at the same time-domain position, or configuring RACH resources of a plurality of types at the same time-domain position, by a network device.

Supplement 2. The method according to supplement 1, wherein different types of RACH resources occupy different time lengths and/or frequency-domain widths and/or numbers of subcarriers, or employ different numerologies, or are used for transmitting different preambles, or are used for transmitting different preambles and data.

Supplement 3. The method according to supplement 1, wherein different types of RACH resources correspond to different preamble configurations.

Supplement 4. An apparatus for configuring RACH resources, including:
a configuring unit configured to configure RACH resources of a single type at the same time-domain position, or configure RACH resources of a plurality of types at the same time-domain position.

Supplement 5. The apparatus according to supplement 4, wherein different types of RACH resources occupy different time lengths and/or frequency-domain widths and/or numbers of subcarriers, or employ different numerologies, or are used for transmitting different preambles, or are used for transmitting different preambles and data.

Supplement 6. The apparatus according to supplement 4, wherein different types of RACH resources correspond to different preamble configurations.

Supplement 7. A network device, including the apparatus as described in any one of supplements 4-6.

What is claimed is:

1. An uplink transmission control apparatus, comprising:
a memory that stores a plurality of instructions; and
a processor coupled to the memory and configured to execute the instructions to:
indicate a transmission configuration via a physical downlink control channel (PDCCH), the transmission configuration implicitly indicating whether a random access control channel (RACH) resource is available by a transmission direction, wherein the RACH resource is semi-statically configured via a RACH configuration, wherein the RACH resource comprises a time resource and a frequency resource,
wherein the RACH resource spans a plurality of symbols within a slot, wherein symbols) for uplink direction and symbol(s) for downlink direction in the slot are indicated by the transmission configuration, and
wherein, the processor is further configured to determine the RACH resource is available when the transmission direction of all of the symbols where the RACH resource is located is an uplink direction.

2. The uplink transmission control apparatus according to claim 1, wherein,
the RACH configuration includes a first configuration and a second configuration, wherein a time length of the RACH resource configured by the first configuration and the time length of the RACH resource configured by the second configuration are different.

3. The uplink transmission control apparatus according to claim 2, wherein the RACH configuration includes the first configuration and the second configuration, and wherein the RACH resource configured by the first configuration and the RACH resource configured by the second configuration overlap with each other in time domain.

4. The uplink transmission control apparatus according to claim 1, wherein a UE determines the transmission direction of the symbols where the RACH resource is located according to the transmission configuration.

5. The uplink transmission control apparatus according to claim 4, wherein, the processor is further configured to determine the RACH resource is not available when the transmission direction of all or part of the symbols where the RACH resource is located is a downlink direction.

6. The uplink transmission control apparatus according to claim 1, wherein different types of RACH resources occupy different time lengths and/or frequency-domain widths and/or numbers of subcarriers, or different types of RACH resources employ different numerologies, or different types of RACH resources are used for transmitting different preambles, or different types of RACH resources are used for transmitting different preambles and data.

7. The apparatus according to claim 1, wherein different types of RACH resources correspond to different preamble configurations.

8. A User Equipment (UE), comprising:
a memory that stores a plurality of instructions;
a processor coupled to the memory and configured to execute the instructions to:
monitor a transmission configuration via physical downlink control channel (PDCCH); and
determine whether a random access channel (RACH) resource is available according to the transmission configuration:
wherein the transmission configuration implicitly indicates whether the RACH resource is available by a transmission direction; and
a transmitter configured to transmit a preamble when determining a RACH resource is available, wherein the RACH resource is semi-statically configured via a RACH configuration, wherein the RACH resource comprises a time resource and a frequency resource,
wherein the RACH resource spans a plurality of symbols within a slot, wherein symbol(s) for uplink direction and symbol(s) for downlink direction in the slot are indicated by the transmission configuration, and
wherein, the processor is further configured to determine the RACH resource is available when the transmission direction of all of the symbols where the RACH resource is located is an uplink direction.

9. The UE according to claim 8, wherein the processor is further configured to determine the transmission direction of the symbols where the RACH resource is located according to the transmission configuration.

10. The UE according to claim 9, wherein the processor is further configured to determine that the RACH resource is not available when the transmission direction of all or part of the symbol where the RACH resource is located is a down link direction.

11. A communication system, comprising:
a network device configured to indicate a transmission configuration via a physical downlink control channel (PDCCH), the transmission configuration implicitly indicating whether a random access control channel (RACH) resource is available by a transmission direction; and a User Equipment (UE) configured to select a RACH resource based on the transmission configuration received via the PDCCH, wherein the RACH resource is semi-statically configured via a RACH configuration, wherein the RACH resource comprises a time resource and a frequency resource, wherein the RACH resource spans a plurality of symbols within a slot, wherein symbol(s) for uplink direction and symbol(s) for downlink direction in the slot are indicated by the transmission configuration, and wherein, the UE is configured to determine the RACH resource is available when the transmission direction of all of the symbols where the RACH resource is located is an uplink direction.

12. A base station comprising:

a transmitter configured to transmit transmission configuration information via a physical downlink control channel (PDCCH), the transmission configuration information indicating whether a random access channel (RACH) resource is available by a transmission direction; and a receiver configured to receive a preamble transmitted according to the transmission configuration information, wherein the RACH resource is semi-statically configured via a RACH configuration, and wherein the RACH resource comprises a time resource and a frequency resource, wherein the RACH resource spans a plurality of symbols within a slot, wherein symbol(s) for uplink direction and symbol(s) for downlink direction in the slot are indicated by the transmission configuration, and wherein, the RACH resource is determined as available when the transmission direction of all of the symbols where the RACH resource is located is an uplink direction.

* * * * *